March 4, 1952
W. BORBERG
2,588,201
VIEWING TELESCOPE FOR IMAGE PROJECTORS
Filed June 25, 1949
2 SHEETS—SHEET 1
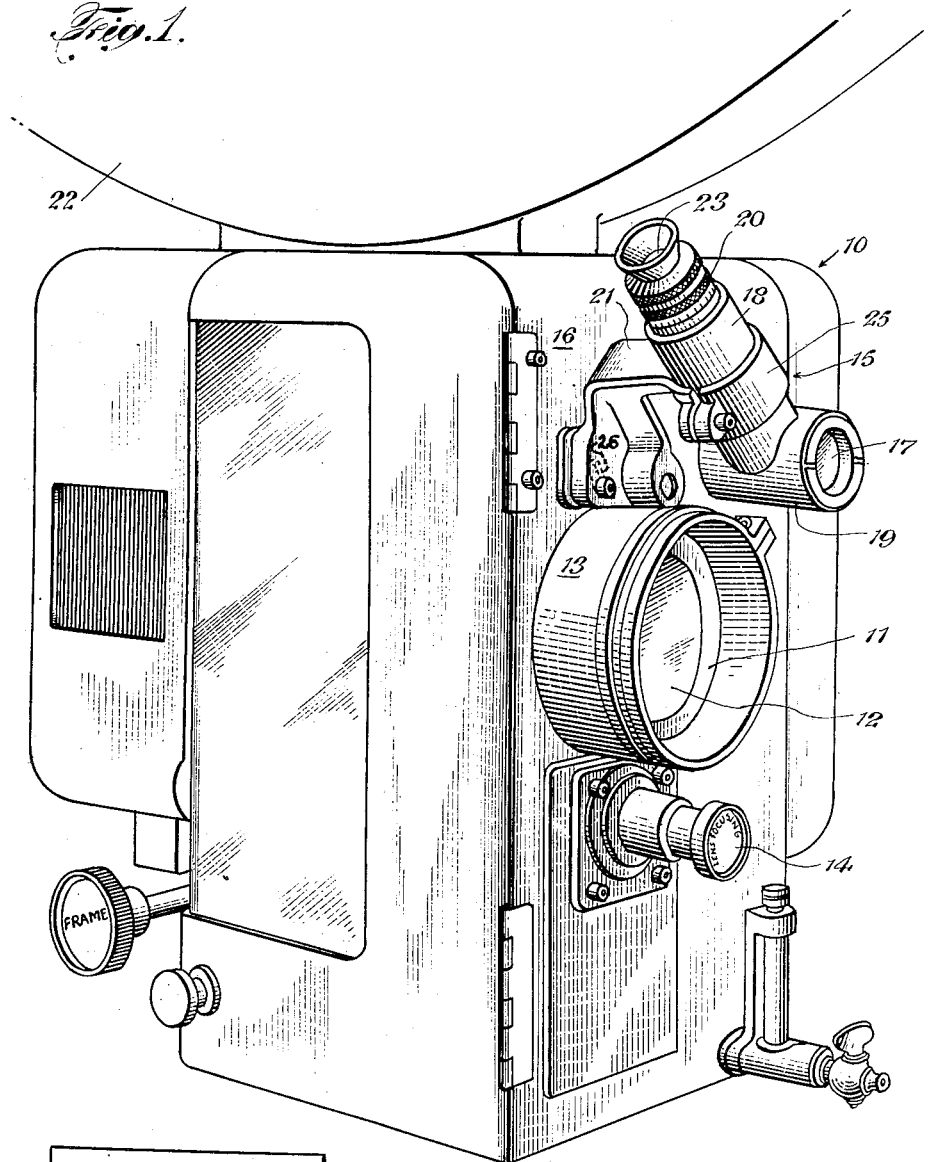
INVENTOR
WILLY BORBERG
BY
James B. Boyer
ATTORNEY March 4, 1952 W. BORBERG 2,588,201
VIEWING TELESCOPE FOR IMAGE PROJECTORS
Filed June 25, 1949 2 SHEETS—SHEET 2
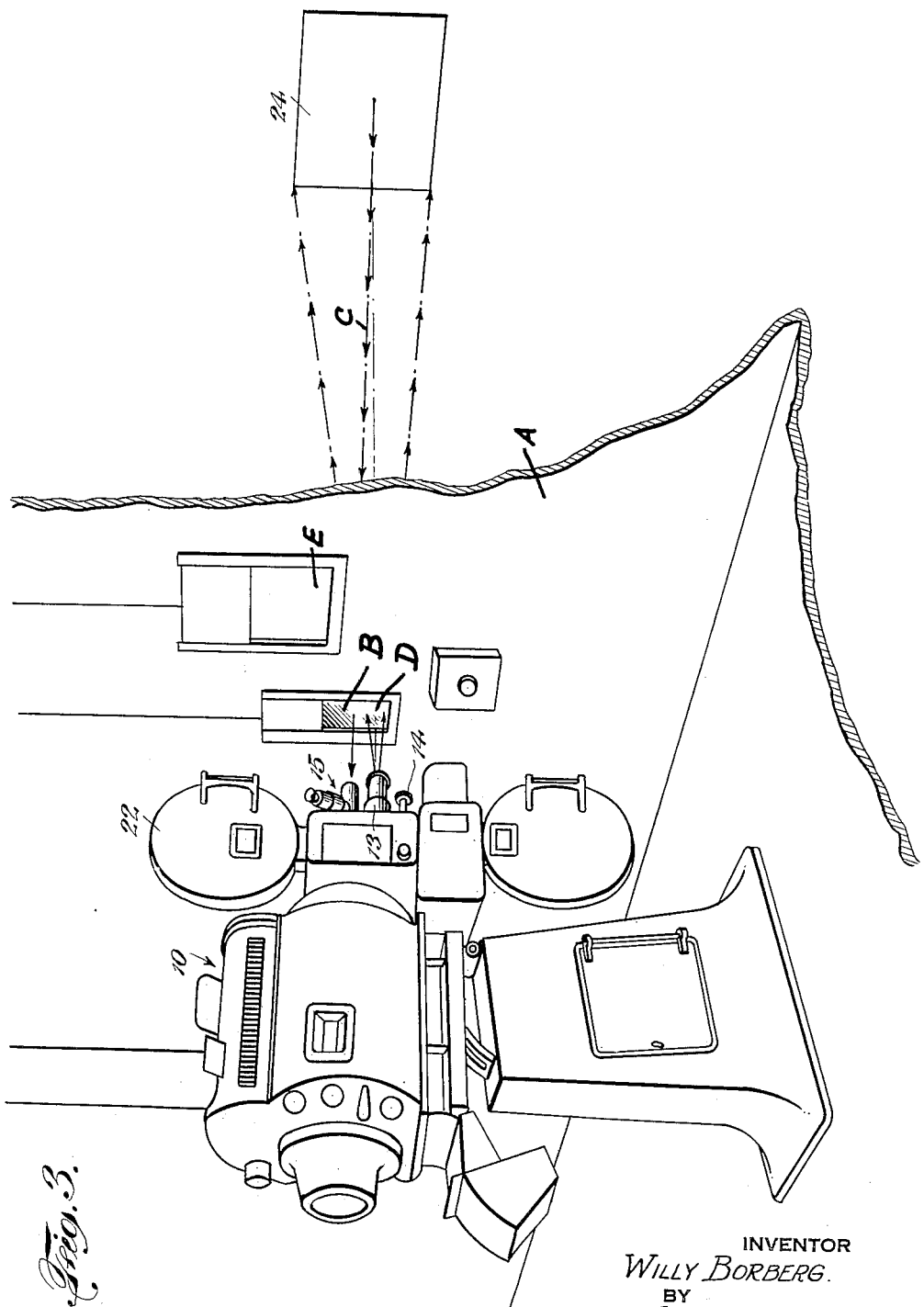
INVENTOR
WILLY BORBERG.
BY
James B Boyer
ATTORNEY Patented Mar. 4, 1952

2,588,201

UNITED STATES PATENT OFFICE 2,588,201

VIEWING TELESCOPE FOR IMAGE PROJECTORS

Willy Borberg, Astoria, N. Y., assignor to International Projector Corporation, Bloomfield, N. J., a corporation of Delaware Application June 25, 1949, Serial No. 101,309

5 Claims. (Cl. 88—24)

1

This invention relates to motion picture projecting machines, and more particularly, to means to enable proper focusing of the projector.

The use of a viewing scope in combination with a moving picture projector enables the correction of focusing conditions not present in combinations of telescopes with other devices as cameras, for instance. In all other instances of such combinations, so far as the inventor is aware, the object viewed is, of itself, perfectly clear and distinct in delineation, outline and detail, providing the observer is close enough to the object, and a telescope is used only when, because of distance, for example, the observer cannot see the object clearly by itself or because intervening material renders the object difficult to see.

In the present instance, as distinguishing from the foregoing instances a picture image, as an object, is projected from the projector bearing the viewing scope onto a substantially plane surface, and said object, (the picture image) when viewed on the screen, itself may be indistinct, fuzzy, confused and ill-defined.

Also use of the viewing scope will enable the operator to more readily detect the presence of "ghosts" on the screens caused by non-synchronization between the shutter and the film feed as well as any slight unsteadiness or shakiness of the picture images on the screen due to faulty film feeding, the controls for correcting which unsatisfactory conditions are within reach of the operator while looking through the viewing scope at the screen.

It will be understood that projection of picture images can and does take place with the optical axis either horizontal or inclined in relation to the screen as circumstances may dictate. The projection distance in the conventional type motion picture theatres, both indoor and outdoor, may vary anywhere from relatively short distances to 250 feet more or less, and this invention may be used to advantage where the footage to the screen is relatively short, as well as up to distances of 250 feet or more.

The observation of the screen image by the operator in regard to sharpness of definition of proper focus becomes increasingly difficult as the length of "throw" or distance between the projector and the screen increases.

Focusing is done by manipulating an adjusting screw on the projector machine which positions the lens with respect to the film so as to obtain the sharpest image on the screen located at a distance from the operator's station near the projector, as above explained.

2

At some of the farther distances, projectionists, even with good eyesight, are incapable of determining the optimum results with respect to definition of the picture image, and thus the projectionists cannot adjust the projector lens to bring out the picture image so sharply as to project a high quality picture image.

Focusing the lens is not only done initially at the installation of the projection equipment, but is required at various times thereafter. For peak performance, focusing is required when changing from a black-and-white film, to, for instance, a colored film, or a news reel film and vice versa. These films may be made of different stock and result in a different behavior under the effect of the concentrated light passing through the different grades of stock at the projection aperture.

Since a considerable amount of this light consists of heat rays, varying grades or types of films will absorb varying amounts of heat even during the short exposure period, which will cause a slight buckling of the film, thus changing the position of the film plane with respect to the projection lens, in consequence of which an out-of-focus condition results.

Occasionally also it is desirbale to check the focus of the projector after the lens has been removed from the lens holder of the projector for cleaning the outer optical surfaces, and reinstalled in the projector.

The lens is equipped with a stop ring which contacts the lens holder to normally arrest the lens, on replacement, in its proper position. If the lens is not brought to home position against the stop ring, this may also result in a slight out-of-focus condition.

In such case, as in the case when a variance in buckling between the various types of films occurs, the out-of-focus condition can be too slight to be observed by the operator in the projection booth remote from the screen, but can be quite evident and noticeable to persons in the audience nearer to the screen.

Corrective steps heretofore taken were either the placing of an observer close to the screen, or the use of binoculars or magnifying glasses by the projectionist.

In the first instance, the observer transmitted his impressions of the picture quality to the projectionist in the projection room by visible or oral signals, both of which are unsuitable during the presentation of the picture, but may only be used before or after the showing. Telephonic communication between the observer and the projectionist would be more convenient, but in all these attempts the interpretation by the projectionist of the observer's impressions may be incorrect and may necessitate several re-adjustments while still failing to attain the peak precision focus.

In an attempt to avoid the above-mentioned disadvantages, the projectionist or operator has restored to the use of binoculars when adjusting the projector lens, to obtain the sharpest possible focus of the picture images on the screen, holding the binoculars to his eyes with one hand as he peers out at the screen through the observation porthole in the booth, while with his other hand, he fumbles for the focusing knob of the projector lens, and turns the knob. The operator is unable to constantly maintain the binoculars trained steadily on the same area of the screen. This disadvantage results in presenting different screen to the operator's view through the binoculars as he is adjusting the focus of the projection machine, making it difficult to observe the changes in definition while making the focusing adjustments.

Another objection to this manner of focusing is that it necessitates the simultaneous use of both hands of the operator.

The discussion thus far relates to the disadvantages of attempting to obtain the peak focusing adjustment assuming that the projector is in a substantially horizontal plane with the center of the screen. In case the projector is located above or below the center of the screen, the difficulties of properly focusing the projector lens are aggravated.

A typical motion picture theatre lay-out generally provides for the location of the projection room behind the last row of seats in the balcony, thus necessitating a downward projection angle It will be realized that the optical axis of the projection system will not be at a right angle to a vertical screen. This brings about a condition that the screen image can be correctly focussed only on a partial area of the screen since the light rays from the projector optic travel a longer distance to reach the bottom of the screen and a shorter distance to reach the top of the screen, resulting in slight out-of-focus appearance of the picture image. A compromise for the best definition will obviously be a sharp focus as determined by the projectionist when viewing a screen area along the horizontal diameter of the screen adjacent the center of the screen, which results in only a slight out-of-focus condition at the top and bottom areas of the screen, respectively.

If the focus control is so adjusted that the best definition is not at the center but at the top of the screen, then a slight out-of-focus condition would exist at the center area, with an out-of-focus condition twice as great at the bottom of the screen, and vice versa if the focusing test area selected is at the bottom of the screen.

Such typical case of projection at a downward angle, illustrates that to obtain the sharpest average definition when focusing the projector, it is necessary to observe the central area of the screen along its horizontal center line and to focus there.

It is obvious that satisfactory results cannot be obtained conveniently either by the use of an observer near the screen whose eyes may not always be fixed on the central area of the screen while he signals the projectionist, or by the wavering use of binoculars.

These same objections apply in cases, such as in many drive-in theaters, where projection occurs at an upward angle.

This invention presents a remedy for the foregoing disadvantages, a principal object being to provide a viewing instrument stationary both with respect to the projector and to the screen for use in focusing.

By fixedly mounting the viewing instrument on the projector the same selected screen area is presented to the eye throughout the focusing operation, and the instrument is always in place ready for use.

Another advantage is that the use of this invention leaves either hand of the operator free, to control the lens adjustment of the projector.

Still another advantage is that the viewing instrument is so placed as to be readily used by the projectionist or operator while standing in a comfortable position convenient to the projection lens adjustment control.

A still further advantage resides in locating the viewing instrument adjacent the projector optic so that the projectionist, in viewing the screen through the viewing instrument, perceives the screen through the optically clear distortion-free glass covering the same port through which the picture images are projected. The port may be hooded to shield the projection port from reflections caused by lights within the projection booth.

Another advantage in mounting the viewing scope fast on the projector lens barrel and in such position that it is always directed to a pre-selected area on the screen at a predetermined distance to one or another side of the optical axis of the projector light beam, is that the projectionist needs only to lean over to apply his eye to the viewing scope without moving away from the machine.

To secure the foregoing advantages, the invention includes novel features and arrangements all of which will be more fully disclosed hereinafter and particularly pointed out in the claims.

In the accompanying drawings forming part of this application,

Fig. 1 is a perspective view taken from the projectionist's side of a motion picture projector, showing the viewing instrument and the projector lens adjusting knob;

Fig. 2 is a fragmentary detail view showing the central part of a screen, with the part seen by the projectionist through the object lens of the viewing scope enlarged as it would appear to him, and Fig. 3 is a perspective view somewhat distorted, showing the projecting machine within a booth, the latter partially broken away to show the porthole through which the rays of image-carrying light are projected upon a screen, the reflected light ray being indicated by the return light beam to the objective lens of the viewing scope.

Referring to the drawings, the projector 10 is located in a projection booth A, Fig. 3, the projecting machine, when installed, being generally tilted or inclined, by means of the usual adjustments, so that the image-projecting light beam is directed through the projection porthole B, in the booth towards the substantially vertical screen surface 24, the projecting light beam being trained on or aimed at the center of the screen. If the screen is in focus at its center, the slight out-of-focus condition at the top and bottom will be the least possible and will be substantially equal, whereas if the top of the screen, for instance, is in focus, an out-of-focus condition would be present at the center of the screen, which would be twice as great at the bottom of the screen, or vice versa.

The light beam passes through a lens 12 held in a lens holder 11 slidably mounted in a lens barrel or tubular sleeve 13 projecting through the front wall 16 of the projector head at right angles thereto. A manipulative lens adjusting knob or device 14 also projects from the front face of the projector head at a point preferably a short distance below the tubular sleeve 13 for ready access by the hand of the operator. The mechanism above described is old in the art and constitutes a part of the present invention only insofar as it combines with the means hereinafter described to accomplish the new and useful result not heretofore obtained in the motion picture projector art.

Preparatory to a showing of the picture images on the screen, it is necessary to focus the lens of the projecting machine relatively to the screen so that the image shall be brought out on the screen in sharpest possible definition or clarity. This focusing can only be effected to obtain the best results after the projector and screen are set up in their respective designated positions.

Moreover, different focusing adjustments of the projector lens are required for obtaining the best and sharpest definitions of picture images on different types of films, as standard, technicolor, or news reel, as heretofore mentioned.

It has been found in practice that in focusing a motion picture machine, it is highly desirable to maintain a certain pre-determined test area of the screen under constant scrutiny throughout the operation of adjusting the lens of the projecting machine, such area preferably being located near the optical center of the screen area occupied by the picture image, because the most important action takes place there, and the optical center constitutes the average projection distance. Furthermore, the best results are obtained by maintaining the viewing instrument constantly in parallelism with the optical axis of the projection lens, which practice lessens the likelihood of improper focusing such as would cause an appearance of angular distortion of the images to the beholder. The viewing instrument should be located close to the focusing or lens adjusting mechanism to move with the projector as it is inclined, and so accessible as to avoid causing the operator to bend or contort his body into uncomfortable positions which must be held during the lens adjusting operation.

To facilitate and expedite the projector lens adjustments, it has been customary, as heretofore explained, for the operator to view the screen through binoculars while adjusting the projector lens by manipulation of the lens adjustment control knob 14, despite the disadvantages above set forth.

As an improvement thereover, the present invention provides a telescope or viewing scope 15 rigidly secured to the outer front wall 16 of the projector, at a point closely adjacent the optical axis of the projector lens barrel 13.

Because of the desirability of providing ready access to the various parts of the projector, the projector casing is provided with hinged doors affording such access, and there are not many places where a viewing scope can be located on the projector in convenient position for use, and without interference with the doors, when opened or with the upper magazine 22, which restriction is increased by the preferable requirement for locating the objective lens 17 of the viewing scope aimed at a predetermined central area of the screen, and closely adjacent and parallel with the barrel of the projector lens.

Since the viewing scope should conform with the above requirements and still be convenient for consultation by the operator, there is provided an eyepiece lens barrel 18 arranged at right angles to the eyepiece barrel 19, the objective lens 17 being mounted in the front end of the objective barrel. The eyepiece barrel 18 projects in a general upward direction from the objective lens barrel, to a point convenient for the projectionist to apply his eye to the eyepiece holder 20. The angularly extending eyepiece barrel is fitted with an adjustable eyepiece holder 20 containing the eyepiece 23. Obviously, the eyepiece lens may be stationary and a lens adjustment provided for the objective lens, or an optical system may be provided for the viewing scope, which may be preset at the factory according to the distance intervening between the screen and projector in any particular instance. Also, the viewing instruments may be equipped with universal or fixed focus optical systems adapted for any distance, say, from 50 to 150 feet, and from 150 feet to 250 feet and the like. But the use of the factory preset, or of the fixed focus lenses in a viewing scope will not enable the projectionist to obtain as good results in clarity or definition of the image, as are obtained from a projectionist-adjusted lens system.

No invention is claimed for the particular viewing scope per se which is constructed in accordance with well known principles of optics, the barrel 18, 19, in addition to the above-mentioned lenses, containing the usual prisms (not shown) to present an erect image to the eye of the operator and with a prism to transmit the image from the lens in the substantially horizontal objective barrel 19 of the viewing scope to the lens 23 of the eyepiece barrel 18 extending at right angles to the objective barrel and at an angle to the horizontal.

The operator's position is on the right side of the projector when looking toward the screen 24, and to arrange the viewing scope so that the operator need not shift from his side of the machine, one end of a bracket 21 is bolted or otherwise secured to the face of the front wall of the projector, the outer end of the bracket having a clamp 25 thereon to grip the barrel 19 of the viewing scope. The angular bracket maintains the barrel 18 of the viewing scope projecting towards the operating side of the machine at an angle to the horizontal, say about 45 degrees, with the eyepiece holder 20 just above and out of the way of the projector door when opened.

After the projecting machine at its installation has been inclined downwardly or upwardly, as the case may be, so that the picture images will be correctly located within the borders of the screen, it being recalled that the viewing scope tilts with the machine, the operator, while the beam is still directed at the screen, will place his eye to the viewing scope, and while still viewing the screen through the scope, will adjust the eye piece of the scope to bring out to his eye the most distinct and clear image of that part of the screen surface (very close to the center of the screen) at which the fixed scope is aimed.

The porthole B is located in the front wall of the fireproof projection booth A, the porthole being located near the bottom of the booth when the projection angle is downward, as in the usual theater, too low for the projectionist to peer therethrough unless crouched in an uncomfortable position.

By mounting the viewing instrument in parallelism with, and adjacent the optical axis of the image carrying projection beam, the ray C reflected back from that area of the screen at which the instrument is aimed, to the viewing instrument, passes in reverse direction through the identical porthole B through which the image-carrying beam projects, so that the reflected ray C, is subjected to the same conditions as the projection light beam, to impart to the eye of the projectionist the same effects that the spectator sees on the screen.

In some cases, the port B, instead of being entirely open, is closed by a sheet of optically clear, distortion-free glass D, set an angle to the vertical, and through which the image-carrying projection beam to the screen, and the reflected light ray from the screen to the viewing scope, pass in opposite directions. Setting the porthole glass at an angle prevents undesirable reflections on the glass or on the objective lenses of the projector and of the viewing scope, occasioned by stray light from the projector lamp or from the projection booth illuminating lamps.

The front wall of the projection booth is provided with the usual observation port E, located above and offset from the projection port, at a height to enable the projectionist to view the screen while standing, and it is through this observation port that the projectionist observes the screen through binoculars when resorting to the previous method of focusing the projector lens.

Some motion picture screens have a distinctive texture which may be perforated, ribbed or otherwise appreciable to the eye, and where such a screen is used, it is convenient to focus the viewing scope on such detail of the screen. Such detail for one type of screen may appear from the scope when sharply focused, somewhat as illustrated in Figure 2. In the absence of an asperous surface, the telescope may be focused on the picture images projected on the screen, or on an object held by an assistant in front of the screen.

As soon as the operator has adjusted the viewing scope lens to obtain the clearest definition of the screen surface or of the images at which the scope is directed, no further adjustment of the lens scope is necessary by that projectionist. Having adjusted the viewing scope so that he is satisfied that the scope conveys to his eye the sharpest delineation or definition of the screen texture, or of the details of the film images projected on the screen, or of an object held close to the screen, the projectionist, while still viewing the screen through the viewing scope, will next proceed to adjust the focus of the projector by operating the lens focusing knob 14.

Assuming that an 8-power viewing scope is used and that the distance between the screen and the viewing scope, as well as the projector lens, is 160 feet, the effect of viewing the relatively large screen which would here be used and the correspondingly large picture images projected thereon through the viewing scope is as if the screen was 20 feet distant, or the images magnified 8 times. Hence the details of the screen and picture images are readily apparent to the eye of the projectionist to enable him to obtain a very fine focus delineation of the picture images. He may to advantage view the screen and picture images through the scope to assure that optimum focusing conditions prevail, each time he threads a new film in the machine. However, it will also be noted that if desired the focusing of the viewing scope and the projector lens may be effected while viewing the screen when illuminated by the bright rays of the projection aperture with no picture image, and particularly where the primary problem of the installation resides in securing the maximum amount of light possible on the screen.

Should a film of a type different from that last focused, be threaded in the machine, as a technicolor film after a standard black and white film, the projectionist need only refocus the projector lens while sighting through the scope without altering the original focus of the viewing scope.

A principal advantage of this invention is to enable the projectionist to place the picture on the screen with the least possible loss of time and particularly when preparing to project different types of films, as in the above example. The invention affords the projectionist a quick and readily adjusted viewing means to assure the proper focusing of the projector for any given type of film which is not readily obtainable by otherwise focusing the projector lens alone.

By providing a projector with a viewing scope set to present the picture image on the screen to the eye of the projectionist in sharpest definition, the projectionist may feel quite safe that the lens focus will not be adversely affected by removing and cleaning the projector lens on the machine not then in use, which is a frequent necessity, since he may check the projection lens by looking through the preset viewing scope after replacing the cleaned lens.

By fixedly mounting the viewing scope directly on the projector and in parallelism with the projector lens barrel, the scope partakes of the adjustment of the projector as a whole when positioning the beam to locate the beam centrally of the screen. An important consideration is that by thus mounting the viewing scope on the machine, the scope can be pre-focused before the picture images are projected on the screen, as above explained.

Just as important, however, is the steadiness of the viewing instrument afforded by mounting it directly on the motion picture projector, whereby the operator views a pre-determined area of the screen where, if the picture images appear at the peak focus, the presentations of the parts of the picture images appearing on other areas will be as clear and undistorted as possible, such area also being the best illuminated and hence affording the best testing area.

It may be that a projectionist in focusing the projector to obtain the best delineation may wish to observe other screen areas in addition to that near the optical center of the projector line beam.

In such instances, the viewing scope may be adjustably mounted in any suitable manner to the motion picture projector, as by connecting the viewing scope to its bracket by any of the well known means, for instance, a universal joint or by adjustably fastening the bracket 21 to the front face 16 of the projector head, as at 26.

The optical system of the viewing scope is obtainable from manufacturers of optical instruments and embodies well known optical principles, but the particular shape of the viewing scope constitutes a part of this invention.

Preferably, the viewing scope should be directed to a point not at the exact center of the screen at which the optical axis of the projecting light beam is directed, but to a point slightly offset from the center along a horizontal line extending across the screen through the center. This is for the reason that the film, as it passes across the projection aperture of the machine, is very slightly bulged and this bowing or convexity of the film tends to very slightly distort the screen image primarily where the optical axis of the projecting beam strikes the screen, that is, at the central point of the screen. Those parts of the picture represented on the flat marginal sides of the film which are not bowed outwardly, are not so distorted when projected on to the screen. Therefore, by aiming the viewing scope at a point along the horizontal line passing across the screen slightly off the center of the screen, an area of average distortion is viewed, to enable the adjustment of the projection lens to bring out the image on the screen to the best average delineation for the spectators.

It will be apparent that the invention may be embodied for use with the projection of television images and that various embodiments and changes in the embodiments may be made to meet the conditions of practical use without departing from the spirit of the invention.

What I claim as new, is:

1. The combination for use with a relatively remote screen upon which images may be projected; of a substantially fixed picture image projecting machine to project images onto the screen, including a projection light; a lens barrel and lens through which the light is directed in a divergent beam onto the screen to illuminate a comparatively large area thereof; means to focus the beam of light for optimum uniformity of light display on the screen and to present the projected images at their sharpest definition; telescope means secured to the motion picture projecting machine adjacent the lens barrel, said telescope being in close proximity to the lens barrel of the projecting machine, said telescope having a lens located near one end which is in substantial parallelism with the lens in the projecting machine lens barrel, and being directed upon the screen to enable the projectionist to view the screen visible through the telescope, and to focus the telescope while viewing said screen, and thereafter, while viewing the screen directly through the fixed telescope to enable the projectionist to focus the picture image projecting machine to obtain the sharpest possible definition of the picture image on the screen.

2. The combination for use with a relatively remote screen upon which images may be projected; of a substantially fixed picture image projecting machine to project images onto the screen, including a projection light; a lens barrel and lens through which the light is directed in a divergent beam onto the screen to illuminate a comparatively large area thereof, the optical axis of the beam of light being constantly aimed at a predetermined point on the screen irrespective of the number of different images projected onto said screen; means to focus the beam of light for optimum uniformity of light display on the screen and to present the projected images at their sharpest definition; telescope means, having angular arms; mounting means for adjustably and fixedly securing the telescope to the picture image projecting machine adjacent and external of the lens barrel for positioning one arm of the angular telescope in proximity to, and in substantial parallelism with, the lens barrel of the projecting machine; telescope optical means associated with said one arm of the angular telescope for directing the main optical axis of the telescope in substantial parallelism with the optical axis of the lens in the image projecting machine; said mounting means including means to adjust the telescope to cause the optical axis of the telescope to be directed upon the screen; the remaining arm of the telescope being inclined upwardly for viewing from above by the projectionist; and an eye piece on said inclined arm to enable the projectionist to focus the telescope while viewing the screen from a point at an angle to and spaced from the main optical axes of both the image projecting machine and the telescope, to present such magnified spot in sharpest definition, and thereafter, to focus the picture image projecting means to obtain the sharpest possible definition of the picture images on the screen.

3. The combination for use with a relatively remote viewing surface upon which images may be projected; of a substantially fixed motion picture projecting machine to project images onto the viewing surface, including a projection light; a lens barrel and lens through which the light is directed in a divergent beam onto the viewing surface to illuminate a comparatively large area thereof, the optical axis of said beam of light being constantly aimed at a predetermined point on the viewing surface irrespective of the number of different images projected onto said surface; means to focus the beam of light to present the projected images on the viewing surface at their sharpest definition; telescope means including an angular barrel; a bracket adjustably mounted on the projecting machine; including bracket means to enable multi-directional adjustment of the telescope relatively to the bracket and to the optical axis of the projection lens for positioning one arm and the main optical axis of the angular telescope in relatively close juxtaposition with respect to, and in substantial parallelism with the lens barrel and optical axis of the projecting machine; said adjustable bracket means facilitating the adjustment of the main optical axis of the telescope optical means to a spot on the viewing surface adjacent that towards which the optical axis of the lens of the projecting machine is aimed; the other arm of the angular telescope barrel being inclined and having an eye piece to enable the projectionist to view the comparatively small magnified area of the viewing surface visible through the telescope at an angle to the main optical axis directed to the viewing surface, and to force the motion picture projecting lens to obtain the sharpest definition of the picture image on the large viewing surface, while viewing the magnified surface area through the telescope.

4. The combination of a substantially fixed image picture projecting machine to project images onto the viewing area of a relatively remote viewing surface, including a projection light; a lens barrel and a lens through which the light is directed in a divergent beam onto the viewing surface to illuminate a comparatively large area, the optical axis of said beam of light being constantly aimed at a predetermined point on the viewing surface irrespective of the number and kind of images projected onto said surface; means to focus the beam of light to present the projected images on the viewing surface at the sharpest available definition; a telescope element including viewing means and optical means; telescope-supporting bracket means to securely support said telescope element adjacent to said beam focussing means and in a position fixed to direct the optical axis of the telescope substantially parallel with the optical axis of the image projecting lens and to the said remote surface viewing area; said viewing means for the bracketed telescope element serving to readily enable the projectionist to directly observe through the telescope the characteristics of the thus disclosed and magnified surface area in sharpest definition to his eye, and thereafter, while viewing the magnified area through the telescope, to focus the projecting lens accordingly.

5. A system to enable a projectionist to more readily project picture images at their sharpest available definition and clarity, including the combination of a substantially fixed motion picture projecting machine to project images onto a relatively remote screen, said projection machine having a projection light; a lens barrel and a lens through which the light is directed in a divergent beam onto the screen to illuminate a comparatively large area; means to focus the beam of light and projected images on the screen, said beam of light being projected along an optical axis to a point substantially coinciding with the optical center of the screen; a telescope arranged in fixed relation with and close proximity to said projector lens barrel, lens and lens focusing means; said telescope including optical lens means laterally offset from and arranged substantially parallel with the projector lens, the optical axis of the telescope lens being directed to a spot on the screen adjacent to the point at which the optical axis of the beam of light impinges on the screen, so that the optical axes of the beam of light and of the telescope optical lens are substantially parallel; the telescope affording the projectionist a magnified, relatively detailed, fixed view of the small area of the screen adjacent the optical center of the screen, as provided by the light beam reflected from the screen to the telescope; means to focus the telescope to present the magnified area of the comparatively small area of the screen in sharpest possible definition to the eye of the projectionist, to enable the projectionist, while observing through the telescope, the magnified, relatively small area of the screen, to adjust the projection lens to obtain the sharpest available definition of the picture image.

WILLY BORBERG.

REFERENCES CITED

The following references are of record in the file of this patent:

UNITED STATES PATENTS

| Number | Name | Date |
|---|---|---|
| 1,318,155 | Kingsley et al. | Oct. 7, 1919 |
| 1,465,626 | Craig | Aug. 21, 1923 |
| 1,572,899 | Mastrukoff | Feb. 16, 1926 |
| 1,721,411 | Ramsey | July 16, 1929 |
| 1,859,207 | Howell | May 17, 1932 |
| 2,021,533 | Wolfe | Nov. 19, 1935 |
| 2,089,703 | May | Aug. 10, 1937 |
| 2,282,045 | Fleischer | May 5, 1942 |
| 2,322,399 | Sperry et al. | June 22, 1943 |